United States Patent
Chan et al.

(10) Patent No.: US 10,226,756 B2
(45) Date of Patent: Mar. 12, 2019

(54) CATALYTIC COMPOSITION FOR SYNTHESIZING CARBON NANOTUBES

(71) Applicants: Fang-Yue Chan, Namur (BE); Julien Amadou, Saint-Gérard (BE); Cédric De Villepin, Etterbeek (BE)

(72) Inventors: Fang-Yue Chan, Namur (BE); Julien Amadou, Saint-Gérard (BE); Cédric De Villepin, Etterbeek (BE)

(73) Assignee: Nanocyl S.A., Sambreville (BE)

(*) Notice: Subject to any disclaimer, the term of this patent is extended or adjusted under 35 U.S.C. 154(b) by 60 days.

(21) Appl. No.: 15/628,049

(22) Filed: Jun. 20, 2017

(65) Prior Publication Data

US 2017/0282158 A1  Oct. 5, 2017

Related U.S. Application Data

(62) Division of application No. 14/005,043, filed as application No. PCT/EP2012/054029 on Mar. 8, 2012, now Pat. No. 9,731,277.

(30) Foreign Application Priority Data

Mar. 18, 2011 (EP) .................................... 11158890

(51) Int. Cl.
 *H01B 1/04* (2006.01)
 *B82Y 30/00* (2011.01)
 (Continued)

(52) U.S. Cl.
 CPC ............... *B01J 23/75* (2013.01); *B82Y 30/00* (2013.01); *B82Y 40/00* (2013.01); *C01B 31/024* (2013.01);
 (Continued)

(58) Field of Classification Search
 CPC .......... B82Y 30/00; B82Y 40/00; H01B 1/04; H01B 1/24
 (Continued)

(56) References Cited

U.S. PATENT DOCUMENTS 3,062,753 A   11/1962  Hayes
5,879,600 A    3/1999  Symons
(Continued)

FOREIGN PATENT DOCUMENTS

CN    101073934       11/2007
CN    101348249 A      1/2009
(Continued)

OTHER PUBLICATIONS

Flavia C.C. Moura et al.; Catalytic Growth of Carbon Nanotubes and Nanofibers on Vermiculite to Produce Floatable Hydrophobic "Nanosponges" for Oil Spill Remediation; Applied Catalysis B: Environmental; 2009; 5 pages. (436-440); vol. 90.

(Continued)

*Primary Examiner* — Tri V Nguyen
(74) *Attorney, Agent, or Firm* — Reinhart Boerner Van Deuren P.C.

(57) ABSTRACT

The present invention relates to a catalytic composition for the synthesis of carbon nanotubes, comprising an active catalyst and a catalytic support, the active catalyst comprising a mixture of iron and cobalt in any oxidation form and the catalytic support comprising exfoliated vermiculite.

13 Claims, 6 Drawing Sheets

(51) Int. Cl.
*B01J 23/75* (2006.01)
*C01B 32/162* (2017.01)
*C01B 32/158* (2017.01)
*B82Y 40/00* (2011.01)
*H01B 1/24* (2006.01)
*C01B 32/164* (2017.01)
*C01B 31/02* (2006.01)
*B01J 21/18* (2006.01)

(52) U.S. Cl.
CPC ........ *C01B 31/0233* (2013.01); *C01B 32/158* (2017.08); *C01B 32/162* (2017.08); *C01B 32/164* (2017.08); *H01B 1/24* (2013.01); *B01J 21/185* (2013.01)

(58) Field of Classification Search
USPC .............. 252/511, 512; 423/447.3; 977/842
See application file for complete search history.

(56) References Cited

U.S. PATENT DOCUMENTS

| | | |
|---|---|---|
| 7,541,311 B2 | 6/2009 | Chen et al. |
| 2008/0213160 A1 | 9/2008 | Silvy et al. |
| 2012/0121891 A1 | 5/2012 | Kim |

FOREIGN PATENT DOCUMENTS

| | | | | |
|---|---|---|---|---|
| CN | 100569509 C | * | 12/2009 | ............ B32B 33/00 |
| EP | 1674154 A1 | | 6/2006 | |

OTHER PUBLICATIONS

Quiang Zhang et al.; Energy-Absorbing Hybrid composites Based on Alternate Carbon-Nanotube and Inorganic Layers; Advanced Materials; 2009; 5 pages. (2876-2880); vol. 21.

Qiang Zhang et al.; Mass Production of Aligned Carbon Nanotube Arrays by Fluidized Bed Catalytic Chemical Vapor Deposition; Carbon; 2010; 14 pages (1196-1209); vol. 48.

Kathyayinia et al. ("Synthesis of carbon nanotubes over transition metal ions supported on Al (OH)3." Indian Journal of Chemistry, 47A, pp. 663-668, May 2008).

Zhang et al. ("Vertically aligned carbon nanotube arrays grown on a lamellar catalyst by fluidized bed catalytic chemical vapor deposition." Carbon, 47, pp. 2600-2610, May 24, 2009).

Zhao et al. (Large scale intercalated growth of short aligned carbon nanotubes among vermiculite layers in a fluidized bed reactor. JPC of Solids, 71, pp. 624-626, Aug. 29, 2009).

Su ("The use of natural materials in nanocarbon syntheis." ChemSusChem, 2, pp. 1009-1020, 2009).

* cited by examiner

Silicone

Silicone

CATALYTIC COMPOSITION FOR SYNTHESIZING CARBON NANOTUBES

CROSS-REFERENCE TO RELATED PATENT APPLICATIONS

This patent application is a divisional of co-pending U.S. patent application Ser. No. 14/005,043, filed Nov. 7, 2013, which claims priority to PCT/EP2012/054029, filed Mar. 8, 2012, which claims priority to European Application No. 11158890.1, filed Mar. 18, 2011, the entire teachings and disclosure of which are incorporated herein by reference thereto.

OBJECT OF THE INVENTION

The present invention relates to a catalytic composition for the synthesis of carbon nanotubes and more particularly to a catalytic composition comprising a mixture of active iron and cobalt sites on an exfoliated vermiculite support. The invention also relates to a method for the synthesis of the catalytic composition and of the carbon nanotubes obtained by means of this catalytic composition. The invention is also directed to polymeric composites comprising the thereby obtained carbon nanotubes with their improved electric features.

STATE OF THE ART

Supported catalysts on exfoliated vermiculite for the synthesis of carbon nanotubes are known from the state of the art. Qiang Zhang, in his article «*Mass production of aligned carbon nano tube arrays by fluidized bed catalytic chemical vapor deposition*» in CARBON 48 (2010)1196-1209 discloses an iron-molybdenum-based supported catalyst on vermiculite. In this document, the exfoliated vermiculite had a particle size comprised between 100 and 250 µm. For the synthesis of the supported catalyst, this vermiculite was suspended in an aqueous solution of $Fe(NO_3)_3 \cdot 9H_2O$ and of $(NH_4)_6Mo_7O_{24} \cdot 4H_2O$.

The synthesis of carbon nanotubes is carried out according to a fluidized bed method and the yields which are relatively low, are located between 0.224 and 1.167 grams of carbon nanotubes per gram of catalyst for a variable synthesis time ranging up to 30 minutes.

Moura et al. in their article «*Catalytic growth of carbon nanotubes and nanofibers on vermiculite to produce floatable hydrophobic «nanosponges» for oil spill remediation*" in Applied catalysis B: Environmental, 2009, vol. 90, pages 436-440, also discloses a supported catalyst based on iron, on molybdenum or on an iron-molybdenum mixture on exfoliated vermiculite. For this purpose, the vermiculite was exfoliated at 1,000° C. for 60 seconds and impregnated with a solution of $Fe(NO_3)_3$ and of $MoO_2(acac)_2$ by using water or methanol as a solvent. Only the iron-molybdenum combinations give rise to a synthesis of carbon nanotubes.

Vermiculite is a clayey hydrated mineral with a lamellar structure of aluminum, iron and magnesium silicates resembling muscovites like mica and when they are subject to heat, they exfoliate depending on the steam generated between the lamellas. Vermiculite is inert and non-combustible, it has a melting temperature around 1,300° C. and a unit weight between 40 and 80 g/l when it is exfoliated.

Document U.S. Pat. No. 3,062,753 A and document U.S. Pat. No. 5,879,600 disclose methods for exfoliating vermiculite and document U.S. Pat. No. 7,541,311 discloses a catalyst using vermiculite. The information on vermiculite contained in these three documents is representative of the knowledge of the person skilled in the art on vermiculite.

OBJECTS OF THE INVENTION

The present invention aims at providing an improved catalytic composition allowing the synthesis of carbon nanotubes with particular features.

It also aims at providing a method for synthesizing carbon nanotubes with said catalyst.

The invention finally aims at disclosing polymeric composites with improved physical properties and obtained by means of the carbon nanotubes synthesized by means of the catalytic composition according to the invention.

SUMMARY OF THE INVENTION

The present invention discloses a catalytic composition for the synthesis of carbon nanotubes comprising an active catalyst and a catalytic support, the active catalyst comprising a mixture of iron and cobalt in any oxidation form and the catalytic support comprising exfoliated vermiculite.

The particular embodiments of the present invention comprise at least one or a suitable combination of the following features:
  in the catalytic composition, the molar proportion of cobalt and iron (Co/Fe) is comprised between 0.1 and 2, preferably between 0.25 and 1.5;
  in the catalytic composition, weight the percentage of the active catalyst relatively to the catalytic composition is comprised between 1.5 and 20% and preferably between 2.2 and 12%, even more preferably between 2.2 and 8%;
  in the catalytic composition, the exfoliated vermiculite has a particle size comprised between 50 and 1,000 µm, preferably between 500 and 1,000 µm;

The present invention also discloses a method for synthesizing the catalytic composition according to the invention comprising the following steps:
  Exfoliation of the vermiculite by treatment of a vermiculite ore at a temperature above 800° C.;
  Contacting the exfoliated vermiculite with a solution of a cobalt and iron salt;
  Calcination of the vermiculite contacted with a solution of a cobalt and iron salt at a temperature above 350° C.

According to particular embodiments, the method comprises at least one or a suitable combination of the following features:
  in the method, the iron salt is $Fe(NO_3)_3 \cdot 9H_2O$;
  in the method, the cobalt salt is $Co(OAc)_2 \cdot 4H_2O$;
  in the method, contacting the exfoliated vermiculite with a solution of a cobalt and iron salt is accomplished by impregnation with an aqueous solution.

The present invention also discloses a method for synthesizing carbon nanotubes by decomposing a gaseous hydrocarbon on a catalytic composition according to the invention comprising the following steps:
  Conditioning the catalytic composition under an inert atmosphere;
  Contacting the catalytic composition with a gaseous carbon source at a temperature between 600 and 800° C. for at least 5 minutes.

According to a particular embodiment of the method for synthesizing carbon nanotubes, the supply of catalytic composition and the extraction of synthesized carbon nanotubes is continuous.

The present invention also discloses polymeric composites comprising carbon nanotubes obtained according to the method of the invention.

SHORT DESCRIPTION OF THE FIGURES

DETAILED DESCRIPTION OF THE INVENTION

Figure 1:
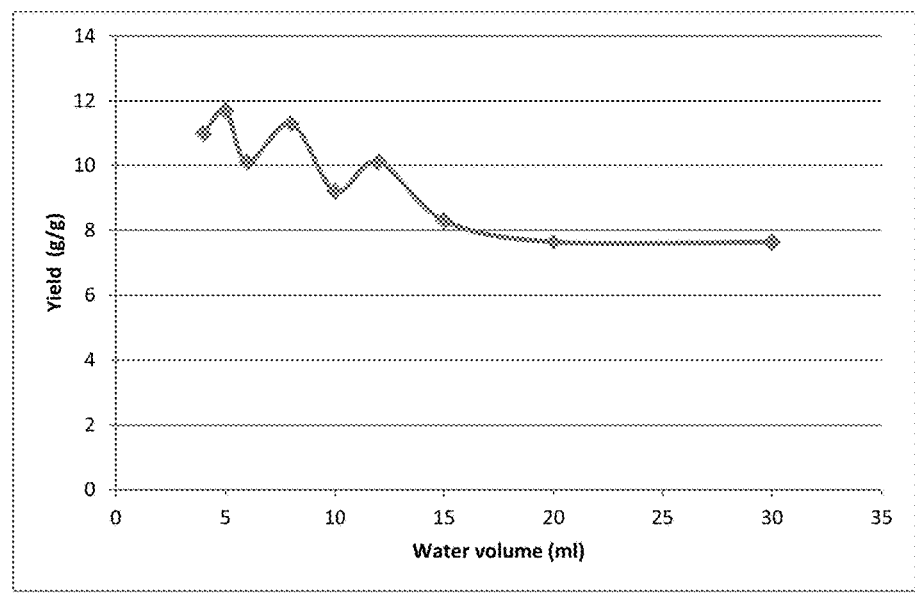
FIG. 1 shows the influence of the water impregnation volume on the yield of the catalytic composition while keeping the molar ratio Co/Fe and the metal percentage constant.

The invention consists in producing a catalytic composition with an active catalyst and a catalytic support, the active catalyst comprising a mixture of cobalt and iron on a catalytic support comprising exfoliated vermiculite. This catalytic composition allows to obtain carbon nanotubes which, when they are dispersed in polymeric matrices, provide a high electric conductivity level with low concentrations of carbon nanotubes. The invention also describes a method for the synthesis of the catalytic composition.

The method for preparing the catalytic composition comprises the following steps:
- Exfoliation of the vermiculite by treatment of a vermiculite ore at a temperature above 800° C.;
- Impregnation of the exfoliated vermiculite with a solution of a cobalt and iron salt.
- Calcination of the impregnated vermiculite under an inert atmosphere at a temperature above 350° C.

Example of Synthesis of the Catalytic Composition
1) Exfoliation of the vermiculite by treatment of a vermiculite ore (Imerys, Shawa mine Zimbabwe) at 900° C. for 2 minutes under nitrogen and then letting it cool down to room temperature.
2) Preparation of a solution of metal salts: 1.14 g of $Fe(NO_3)_3.9H_2O$ and 0.35 g of $Co(OAc)_2.4H_2O$ are weighed, and then dissolved in 10 ml of water.
3) Impregnation: The solution is poured into 6 g of exfoliated vermiculite. Mixing is performed with a spatula for homogenization. Impregnation is left to act for about 1 night.
4) Drying/calcination: The mixture is calcined under nitrogen according to a temperature program consisting of a rapid rise in temperature up to 400° C., followed by a plateau for 1 hour and then by cooling.

Example of Synthesis of Carbon Nanotubes
1) 1 g of catalyst is weighed and then scattered on a container.
2) The container is placed in the cold area of the reactor. The plug of the quartz tube is placed and a flow of 2 l/min of nitrogen is let through for 6 mins.
3) A nitrogen, ethylene and hydrogen mixture is let through with flows of 0.857 l/min, 1.744 l/min and 0.286 l/min respectively. One waits for 6 mins so that the concentrations in the reactor stabilize.
4) The container is introduced into the hot area of the reactor, adjusted beforehand to 700° C. It is left to react for 20 mins.
5) The gases are stopped and a flow of 2 l/min of nitrogen is introduced. The container is placed in the cold area. The container is left to cool for 6 mins. The plug is opened and the nanotubes are collected.

After having synthesized the carbon nanotubes by means of the catalytic composition according to the invention, the latter are dispersed by conventional means into various polymeric matrices.

Example of Dispersion of Carbon Nanotubes in a Polycarbonate Matrix 12.5 g mixtures are prepared containing 0.75%, 1%, 1.5%, 2%, 3%, 4% respectively by mass fraction of carbon nanotubes in a polycarbonate matrix PC2205.

The different mixtures are passed into a co-rotary twin-screw micro-extruder of the 15 $cm^3$ DSM Xplore type. Mixing is performed at 280° C., at 50 rpm for 5 minutes.

The molten mixture is then injected with a micro-injector of the 12 $cm^3$ DSM Xplore type, the piston chamber of which is heated to 280° C. and the mold to 100° C. The injection is achieved with a pressure of 8 bars for 2 seconds, followed by a rise up to 12 bars within 8 seconds and finally 12 bars are maintained for 4 seconds. The mold is a 2-bar IZOD mold.

The ends of the bars are sawed over 3 mm.

Silver paint is applied on the ends of the bars and the 2-point measurement of bulk resistivity is carried out with a multimeter of the Keithley 2700 type.

Silver paint is applied in 2 strips separated by 1 cm and the 2-point measurement of surface resistivity is carried out with a multimeter of the Keithley 2700 type. The results of these measurements are illustrated in FIGS. 7 to 11.

Influence of Different Parameters on the Yield of the Catalytic Composition According to the Invention

EXAMPLES

A) The Co/Fe Ratio

Figure 2:
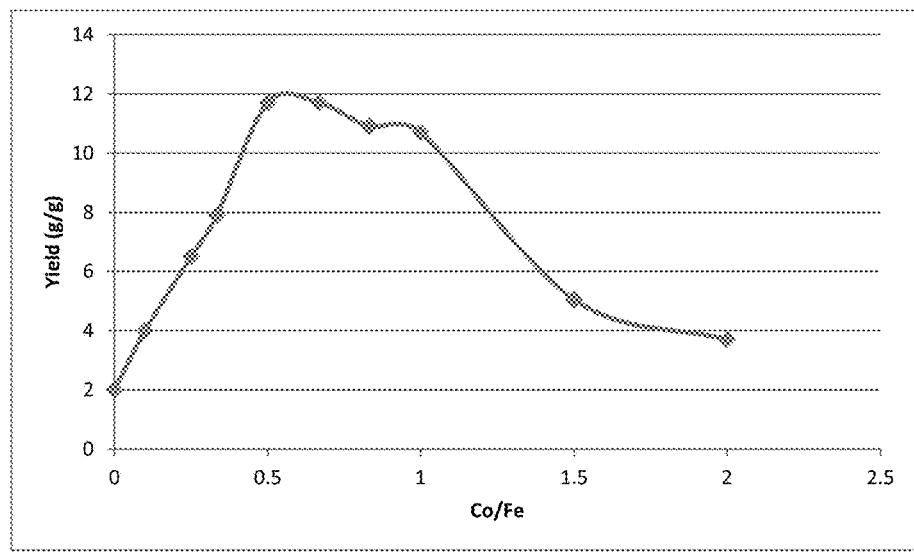
FIG. 2 shows the influence of the Co/Fe ratio on the yield of the catalyst. A series of 10 catalysts was prepared while keeping a level of 4% of metals.

FIG. 2 shows different Co/Fe ratios. Maximum productivity is reached with a ratio of about 0.5 to 0.66.

Preparation Conditions

| Support | Metals | Impregnation | calcination |
|---|---|---|---|
| 6 g Imerys Vermiculite, Shawa Mine Zimbabwe, Micron Sifted (>500 μm) Exfoliated for 2 mins at 900° C. under 2 l/min of $N_2$ | $Fe(NO_3)_3 \cdot 9H_2O$ $Co(OAc)_2 \cdot 4H_2O$ Variable Co/Fe molar ratio Mass % of metal = 4.0% | Water volume: 8 ml Rest: 16 h | 400° C. 1 h 1 m³/h $N_2$ |

Results

| Catalyst | Mass of $Co(OAc)_2 \cdot 4H_2O$ | Mass of $Fe(NO_3)_3 \cdot 9H_2O$ | Co/Fe molar ratio | Yield (g/g) |
|---|---|---|---|---|
| 137 | 0.35 | 1.14 | 1/2 | 11.7 |
| 138 | 0.26 | 1.28 | 1/3 | 7.9 |
| 139 | 0.53 | 0.86 | 1/1 | 10.7 |
| 185 | 0.63 | 0.69 | 3/2 | 5.04 |
| 143 | 0.42 | 1.03 | 2/3 | 11.7 |
| 144 | 0.48 | 0.94 | 5/6 | 10.9 |
| 177 | 0.34 | 0.28 | 2/1 | 3.7 |
| 178 | 0.11 | 0.69 | 1/4 | 6.5 |
| 235 | 0.1 | 1.57 | 1/10 | 3.99 |
| 193 | 0 | 1.74 | 0/1 | 2.0 |

B) Percentage of Metal in the Catalytic Composition

Figure 3:
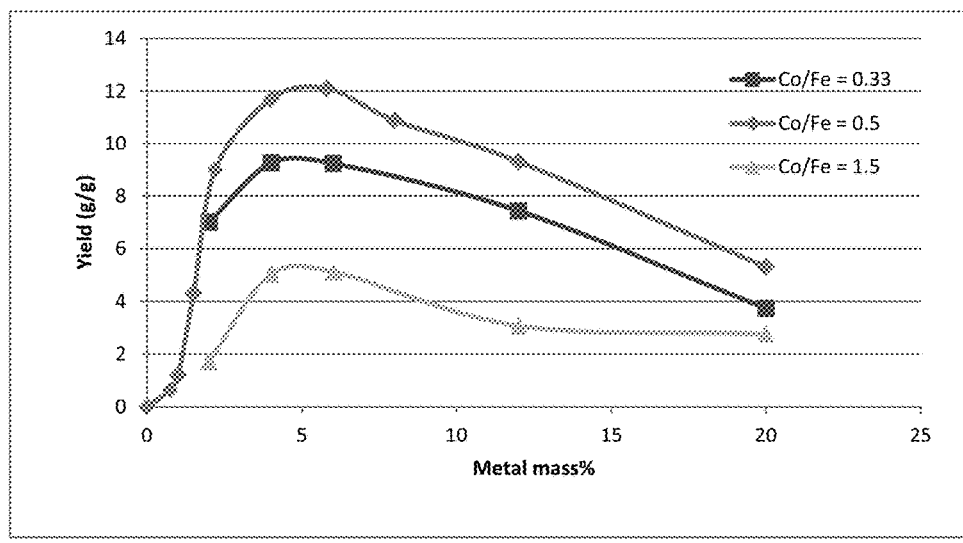
FIG. 3 shows the influence of the percentage of metals on the yield of the catalyst.

Three series of catalysts were prepared. The series with the constant ratio Co/Fe=0.333 and Co/Fe=1.5 comprises 4 points. The series with the constant ratio Co/Fe=0.5 comprises 9 points. The curves of FIG. 3 show that a metal percentage around 5% gives the best yield in the catalytic composition regardless of the Co/Fe ratio.

Preparation Conditions

| Support | Metal | Impregnation | calcination |
|---|---|---|---|
| 6 g Imerys Vermiculite, Shawa Mine Zimbabwe, Micron Sifted (>500 μm) Exfoliated for 2 mins at 900° C. under 2 l/min of $N_2$ | $Fe(NO_3)_3 \cdot 9H_2O$ $Co(OAc)_2 \cdot 4H_2O$ Co/Fe molar ratio: 0.33; 0.5 and 1.5 Mass % of metal = variable from 0.74 to 20. | Water volume: 8 ml Rest: 16 h | 400° C. 1 h 1 m³/h $N_2$ |

Results

| Catalyst | Mass of $Co(OAc)_2 \cdot 4H_2O$ | Mass of $Fe(NO_3)_3 \cdot 9H_2O$ | Mass % of metal | Co/Fe molar ratio | Yield (g/g) |
|---|---|---|---|---|---|
| 146 | 0.064 | 0.21 | 0.74 | 0.5 | 0.64 |
| 195 | 0.086 | 0.284 | 1 | 0.5 | 1.2 |
| 194 | 0.132 | 0.426 | 1.5 | 0.5 | 4.31 |
| 142 | 0.19 | 0.62 | 2.2 | 0.5 | 9 |
| 137 | 0.35 | 1.14 | 4 | 0.5 | 11.7 |
| 141 | 0.51 | 1.66 | 5.8 | 0.5 | 12.1 |
| 182 | 0.7 | 2.274 | 8 | 0.5 | 10.9 |
| 183 | 1.052 | 3.41 | 12 | 0.5 | 9.3 |
| 196 | 1.752 | 5.682 | 20 | 0.5 | 5.31 |
| 184 | 0.31 | 0.336 | 2 | 1.5 | 1.72 |
| 185 | 0.622 | 0.672 | 4 | 1.5 | 5.04 |
| 186 | 0.932 | 1.008 | 6 | 1.5 | 5.13 |
| 187 | 1.864 | 2.016 | 12 | 1.5 | 3.07 |
| 234 | 3.10 | 3.66 | 20 | 1.54 | 2.76 |
| 188 | 0.132 | 0.642 | 2 | 0.33 | 7.01 |
| 189 | 0.264 | 1.284 | 4 | 0.33 | 9.26 |
| 190 | 0.396 | 1.926 | 6 | 0.33 | 9.24 |
| 191 | 0.792 | 3.854 | 12 | 0.33 | 7.44 |
| 233 | 1.32 | 6.42 | 20 | 0.33 | 3.74 |

C) The Vermiculite Type

A series of 3 catalysts was prepared from 3 vermiculites of different origin. The Imerys and Nestaan vermiculites were thermally exfoliated at about 900° C. under nitrogen. Sifting was also required for removing the impurities (>500 μm). The results show that the origin of the vermiculite has little influence on the yield of the catalyst.

Preparation Conditions

| Metals | Impregnation | calcination |
|---|---|---|
| 1.14 g $Fe(NO_3)_3 \cdot 9H_2O$ 0.35 g $Co(OAc)_2 \cdot 4H_2O$ Fe/Co molar ratio = 2/1 Mass % of metal = 4.0% | Water volume: 5 ml Rest: 16 h | 400° C. 1 h 1 m³/h $N_2$ |

Results

| Catalyst | Provider | Grade | Origin | Preparation | Yield (g/g) |
|---|---|---|---|---|---|
| 173 | Imerys | M8 | Mud tank (Australia) | sifted (>500 μm), exfoliated at 900° C. under $N_2$ | 9.7 |
| 137 | Imerys | Micron | Shawa mine (Zimbabwe) | sifted (>500 μm), exfoliated at 900° C. under $N_2$ | 11.7 |
| 169 | Nestaan | Micron | (China) | Already exfoliated | 10.5 |

D) Synthesis Time

Figure 4:
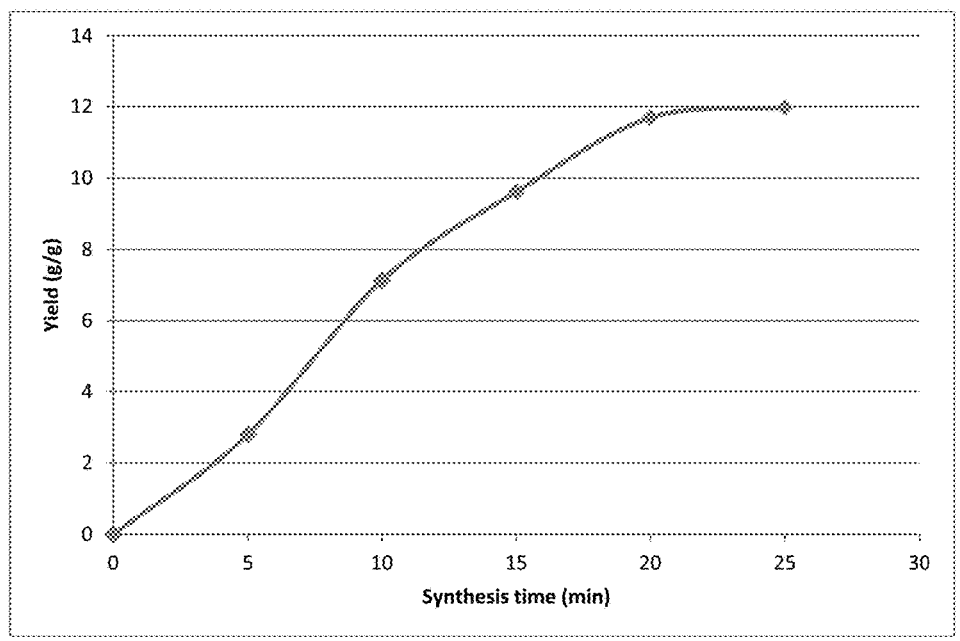
FIG. 4 shows the influence of the synthesis time on the yield of the catalyst (a plateau is reached after 25 minutes).
Figure 5:
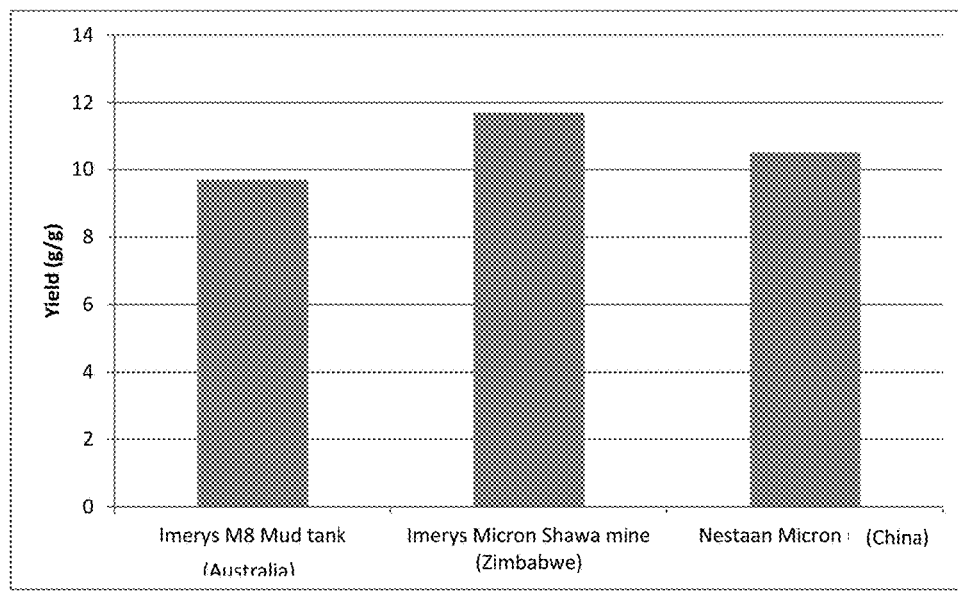
FIG. 5 shows the influence of the vermiculite type on the yield of the catalyst.
Figure 6:
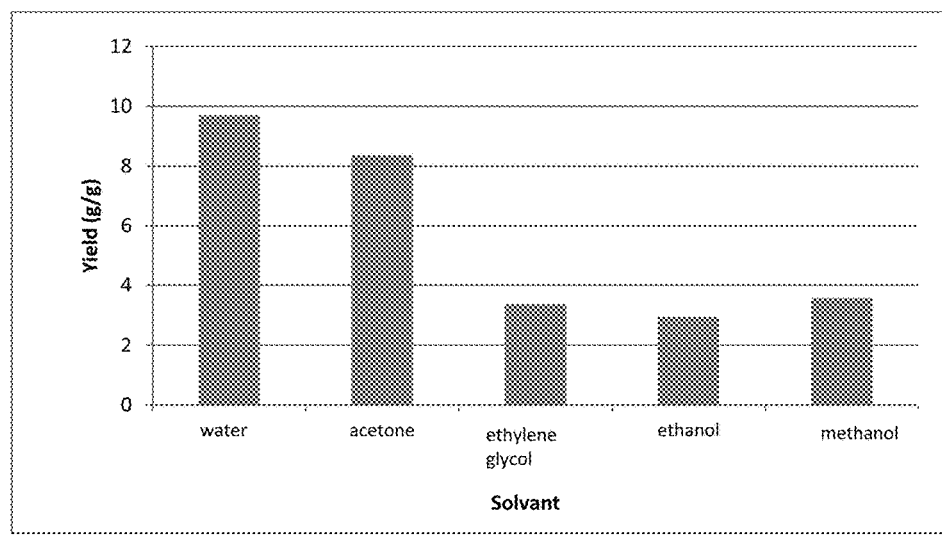
FIG. 6 shows the influence of the type of solvent used for dissolving the metal salts on the yield of the catalyst.
Figure 7:
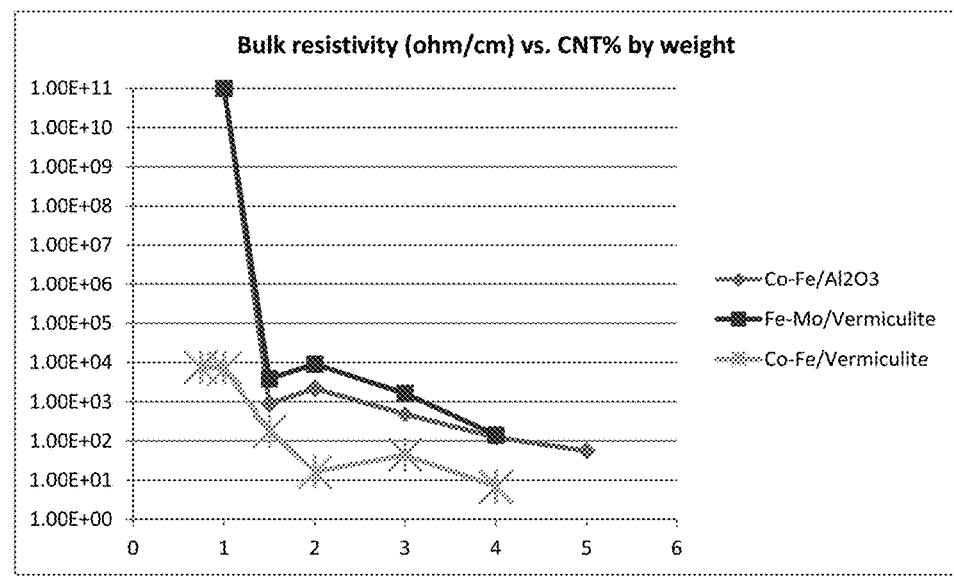
FIG. 7 shows the bulk resistivity of a polycarbonate composite (Makrolon 2205-Bayer) using different concentrations of carbon nanotubes obtained by various synthesis methods comprising the carbon nanotubes obtained by catalytic synthesis on a vermiculite support according to the invention.
Figure 8:
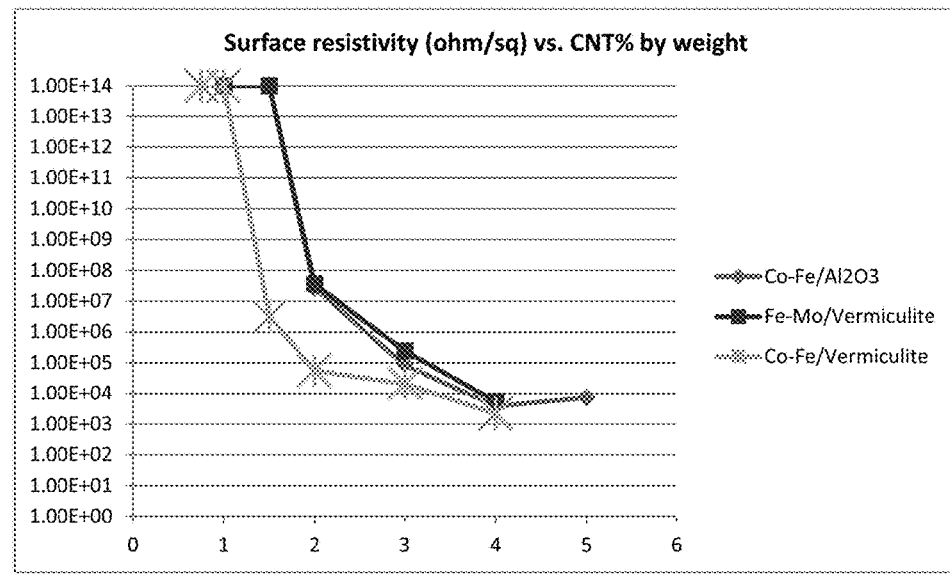
FIG. 8 shows the surface resistivity of a polycarbonate composite comprising different concentrations of carbon nanotubes obtained by various synthesis methods including the carbon nanotubes obtained by catalytic synthesis on a vermiculite support according to the invention.
Figure 9:
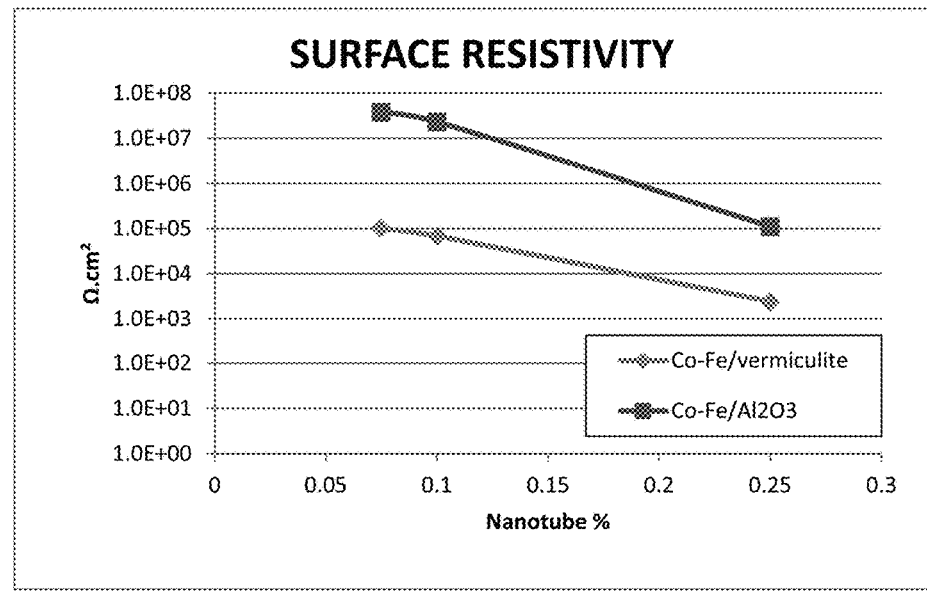
FIG. 9 shows the surface resistivity and FIG. 10 shows the bulk resistivity of a polysiloxane composite (VQM 809+ crosslinker 100+Catalyst 510+inhibitor 600-Hanse Chemie) comprising different concentrations of the carbon nanotubes obtained by various synthesis methods including the carbon nanotubes obtained by catalytic synthesis on a vermiculite support according to the invention.
Figure 10:
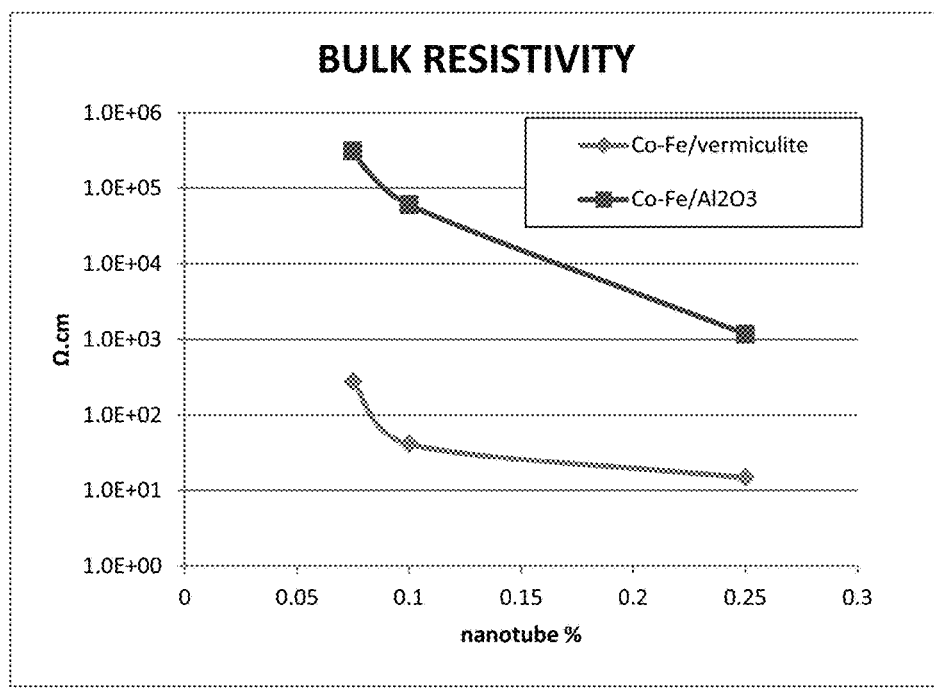
Figure 11:
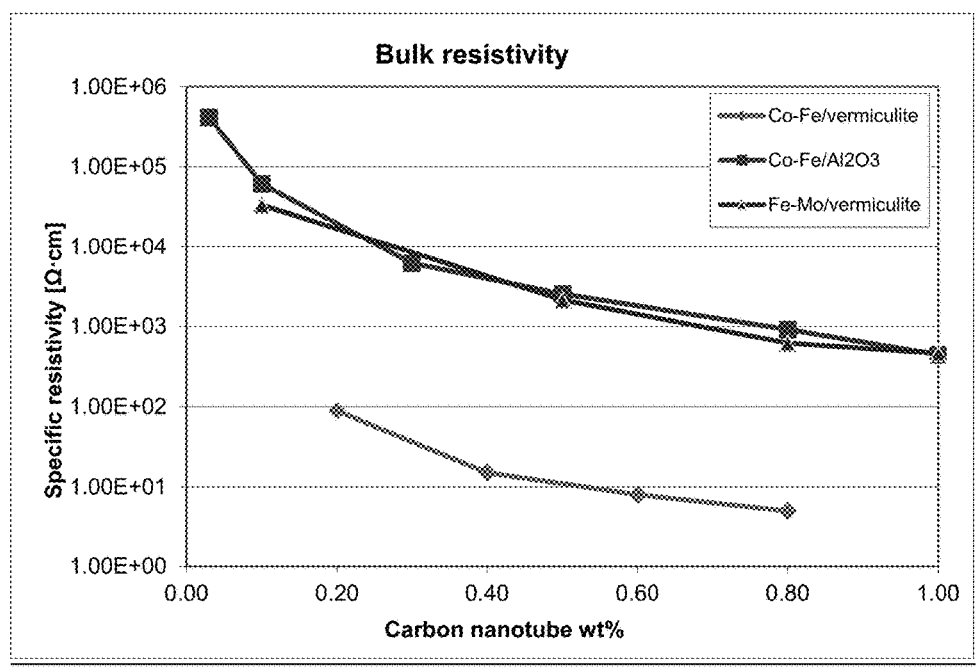
FIG. 11 shows the surface resistivity of a composite of an epoxy resin (Epikote 828—Hexion) comprising different concentrations of carbon nanotubes obtained by various synthesis methods comprising the carbon nanotubes obtained by catalytic synthesis on a vermiculite support according to the invention.

In FIG. 4, it is clearly shown that after 25 minutes a yield plateau is reached.

Preparation Conditions

| Support | Metals | Impregnation | calcination |
|---|---|---|---|
| 6 g Imerys Vermiculite, Shawa Mine Zimbabwe, Micron Sifted (>500 μm) Exfoliated for 2 mins at 900° C. under 2 l/min de $N_2$ | 1.03 g $Fe(NO_3)_3 \cdot 9H_2O$ 0.42 g $Co(OAc)_2 \cdot 4H_2O$ Co/Fe molar ratio: 0.66 Mass % of metal = 4.0% | Water volume: 8 ml Rest: 16 h | 400° C. 1 h 1 $m^3$/h $N_2$ |

Results

| Catalyst | Synthesis time (min) | Yield (g/g) |
|---|---|---|
| 143 | 10 | 7.13 |
| | 15 | 9.61 |
| | 20 | 11.69 |
| | 25 | 11.98 |

E) Influence of the Type of Solvents 5 catalysts were prepared from 5 different solvents. The vermiculite used is the one from Australia.

Preparation Conditions

| Support | Metals | Impregnation | calcination |
|---|---|---|---|
| 6 g Imerys Vermiculite, Mud Tank Mine (Australia) Sifted (>500 μm) Exfoliated for 2 mins at 900° C. under 2 l/min of $N_2$ | 1.14 g $Fe(NO_3)_3 \cdot 9H_2O$ 0.35 g $Co(OAc)_2 \cdot 4H_2O$ Fe/Co molar ratio = 2/1 Mass % of metal = 4.0% | Solvent volume: 5 ml Rest: 16 h | 400° C. 1 h 1 $m^3$/h $N_2$ |

Results

| Catalyst | Solvent | Yield (g/g) |
|---|---|---|
| 173 | Water | 9.7 |
| 174 | Acetone | 8.37 |
| 200 | Ethylene glycol | 3.37 |
| 231 | Ethanol | 2.94 |
| 232 | Methanol | 3.58 |

The results show that the solvent has an influence on the yield of the catalyst. Although water in this specific case is the best solvent, an organic solvent such as acetone may also give a high-yield catalyst.

Furthermore, an additional catalyst was prepared with 1.14 g of $Fe(NO_3)_3.9H_2O$ and 0.41 g of $Co(NO_3)_2.6H_2O$ (Co/Fe ratio=0.5) in 5 ml of acetone. The latter gave a yield of 5.83 g/g. This shows that a good solvent-salts combination may sometimes be necessary for having a high-yield catalyst.

F) The Water Impregnation Volume

In order to determine the limit between an impregnation and a suspension method, different volumes of water were tested (see FIG. 1).

Preparation Conditions for the Catalytic Composition

| Support | Metals | Impregnation | calcination |
|---|---|---|---|
| 6 g Imerys Vermiculite, Shawa Mine Zimbabwe, Micron, sifted (>500 μm) Exfoliated for 2 mins at 900° C. under 2 l/min of $N_2$ | 1.14 g of $Fe(NO_3)_3 \cdot 9H_2O$ 0.35 g of $Co(OAc)_2 \cdot 4H_2O$ Fe/Co molar ratio = 2/1 Mass % of metal = 4.0% | Water volume: variable from 4 to 30 ml Rest: 16 h | 400° C. 1 h 1 $m^3$/h $N_2$ |

Results

| Catalyst No. | Water volume (ml) | Yield (g/g) |
|---|---|---|
| 114 | 10 | 9.2 |
| 134 | 8 | 11.3 |
| 135 | 12 | 10.1 |
| 137 | 5 | 11.7 |
| 138 | 8 | 7.9 |
| 145 | 4 | 11.0 |
| 179 | 15 | 8.3 |
| 180 | 20 | 7.6 |
| 181 | 30 | 7.6 |

The impregnation may be considered as «dry» when the water volume is less than 10 ml for 6 g of vermiculite. Beyond this volume, the vermiculite is immersed in the metal solution and during drying, a deposition of metals may occur on the walls of the container. This loss of metals is expressed by a reduction in the yield. The water volume threshold may however depend on the grain size of the vermiculite used.

Method by Filtration as Compared with the Method by Infiltration

A series of 4 catalysts was also prepared by the method of the articles of Zhang et al. i.e. by suspension-filtration, by using the best metal salts ($Fe(NO_3)_3.9H_2O$ and $Co(OAc)_2.4H_2O$) and the best Co/Fe ratio (1/2).

Preparation Conditions 6 g of Nestaan micron vermiculite are placed in an Erlenmeyer. Water and a magnetic stirrer are added therein. The mixture is stirred at 80° C. for 6 hours in order to generate a suspension. An aqueous solution of $Fe(NO_3).9H_2O$ and of $Co(OAc)_2.4H_2O$ is added therein. The mixture is filtered by means of a frit in vacuo. The obtained paste is calcined at 400° C. under nitrogen for 1 hour.

2 volumes of water as well as 2 amounts of metal salts are used.

| Mass of metal salts | $H_2O$ (ml) | Yield (g/g) |
|---|---|---|
| 1.14 g $Fe(NO_3)_3$•$9H_2O$ + 0.35 g $Co(OAc)_2$•$4H_2O$ | 50 | 1.0 |
| 1.14 g $Fe(NO_3)_3$•$9H_2O$ + 0.35 g $Co(OAc)_2$•$4H_2O$ | 100 | 0.16 |
| 4.54 g $Fe(NO_3)_3$•$9H_2O$ + 1.40 g $Co(OAc)_2$•$4H_2O$ | 50 | 11.9 |
| 4.54 g $Fe(NO_3)_3$•$9H_2O$ + 1.40 g $Co(OAc)_2$•$4H_2O$ | 100 | 7.2 |

It can be seen that this preparation method may give rise to active catalysts with high yield provided that sufficiently concentrated metal solutions are available, nevertheless it shows a few difficulties as compared with the method by dry impregnation:
the level of metals deposited on the vermiculite is difficult to control, it depends on the filtration quality;
the preparation time is very long, notably for suspension and filtration;
this method requires a larger amount of metal salts, a good portion is lost in the filtrate.

The invention claimed is:

1. A polymeric composition comprising:
a polymeric matrix; and
carbon nanotubes, wherein the carbon nanotubes are dispersed in the polymer matrix and wherein the carbon nanotubes are obtained by decomposing a gaseous hydrocarbon on a catalytic composition, the catalytic composition comprising:
an active catalyst, comprising a mixture of iron and cobalt in any oxidation form; and
a catalytic support, comprising exfoliated vermiculite;
wherein decomposing a gaseous hydrocarbon on the catalytic composition comprises the following steps:
conditioning the catalytic composition under an inert atmosphere;
contacting the catalytic composition with a gaseous carbon source;
wherein the polymeric composition comprises residues of the catalytic composition.

2. The polymeric composition according to claim 1, wherein the polymeric matrix comprises polycarbonate.

3. The polymeric composition according to claim 2, wherein the polymeric composition has a bulk resistivity of less than 10,000 Ω/cm for any composition comprising at least 1 wt % carbon nanotubes.

4. The polymeric composition according to claim 3, wherein the bulk resistivity is less than 100 Ω/cm for any composition comprising at least 2 wt % carbon nanotubes.

5. The polymeric composition according to claim 2, comprising 2 wt % carbon nanotubes, wherein the polymeric composition has a bulk resistivity of at least 100 times less than a comparable polymeric composition comprising polycarbonate and carbon nanotubes grown from a catalytic composition of either cobalt and iron on $Al_2O_3$ or iron and molybdenum on vermiculite.

6. The polymeric composition according to claim 1, wherein the polymeric matrix comprises silicone.

7. The polymeric composition according to claim 6, wherein the polymeric composition has a surface resistivity of less than $10^5$ Ω/$cm^2$ for any composition comprising at least 0.1 wt % carbon nanotubes.

8. The polymeric composition according to claim 6, wherein the polymeric composition has a bulk resistivity of less than 100 Ω/cm for any composition comprising at least 0.1 wt % carbon nanotubes.

9. The polymeric composition of claim 6, comprising from 0.1 to 0.25 wt % carbon nanotubes, wherein the polymeric composition has a bulk resistivity of at least 10 times less than a comparable polymeric composition comprising silicone and carbon nanotubes grown from a catalytic composition of cobalt and iron on $Al_2O_3$.

10. The polymeric composition of claim 6, comprising from 0.1 to 0.25 wt % carbon nanotubes, wherein the polymeric composition has a surface resistivity of at least 10 times less than a comparable polymeric composition comprising silicone and carbon nanotubes grown from a catalytic composition of cobalt and iron on $Al_2O_3$.

11. The polymeric composition according to claim 1, wherein the polymeric matrix comprises epoxy.

12. The polymeric composition according to claim 11, wherein the polymeric composition has a bulk resistivity of less than 100 Ω/cm for any composition comprising at least 0.2 wt % carbon nanotubes.

13. The polymeric composition according to claim 11, comprising at least 0.2 wt % carbon nanotubes, wherein the polymeric composition has a bulk resistivity of at least about 100 times less than a comparable polymeric composition comprising epoxy and carbon nanotubes grown from a catalytic composition of either cobalt and iron on $Al_2O_3$ or iron and molybdenum on vermiculite.

* * * * *